United States Patent [19]

Carlson

[11] 3,995,750
[45] Dec. 7, 1976

[54] DOCUMENT TRANSPORT AND SYSTEM
[75] Inventor: Alvin R. Carlson, Pico Rivera, Calif.
[73] Assignee: Bank of America National Trust & Savings Association, San Francisco, Calif.
[22] Filed: Dec. 11, 1974
[21] Appl. No.: 531,529

[52] U.S. Cl. .......................... 214/11 R; 209/74 M; 197/19; 271/277; 271/4
[51] Int. Cl.² ....................................... B65G 43/00
[58] Field of Search ............... 209/74 M, 74 R, 73, 209/DIG. 1; 214/11 R, 11 C; 271/277, 275, 276, 4, 5, 6, 10, 12; 197/19; 40/68, 78.07, 78.09

[56] References Cited
UNITED STATES PATENTS

| | | | |
|---|---|---|---|
| 2,812,079 | 11/1957 | Carnine et al. | 214/11 R |
| 3,219,204 | 11/1965 | Sassen et al. | 214/11 R |
| 3,368,701 | 2/1968 | Copping et al. | 214/11 R |
| 3,594,549 | 7/1971 | Frank | 271/10 |

Primary Examiner—Allen N. Knowles
Attorney, Agent, or Firm—Flehr, Hohbach, Test, Albritton & Test

[57] ABSTRACT

A document transport and system particularly useful as a bank-proof machine employs a keyboard of a type for normal use with two hands simultaneously for recording data read from checks by the keyboard operator. A feed hopper feeds checks one at a time from the hopper to a cyclic check-transport carrier interposed between the hopper and a check-transport channel for receiving the checks and carrying the checks therealong. The surface of the carrier is disposed to receive checks thereon from the hopper at a position disposed to permit reading of the checks by the keyboard operator as the carrier moves to carry the checks to the check-transport channel. Means are provided for retaining the checks to the carrier for reading by the operator and for releasing the checks from the carrier at a position in the movement thereof so as to discharge the checks into the transport channel, and for moving the checks along the channel.

10 Claims, 6 Drawing Figures

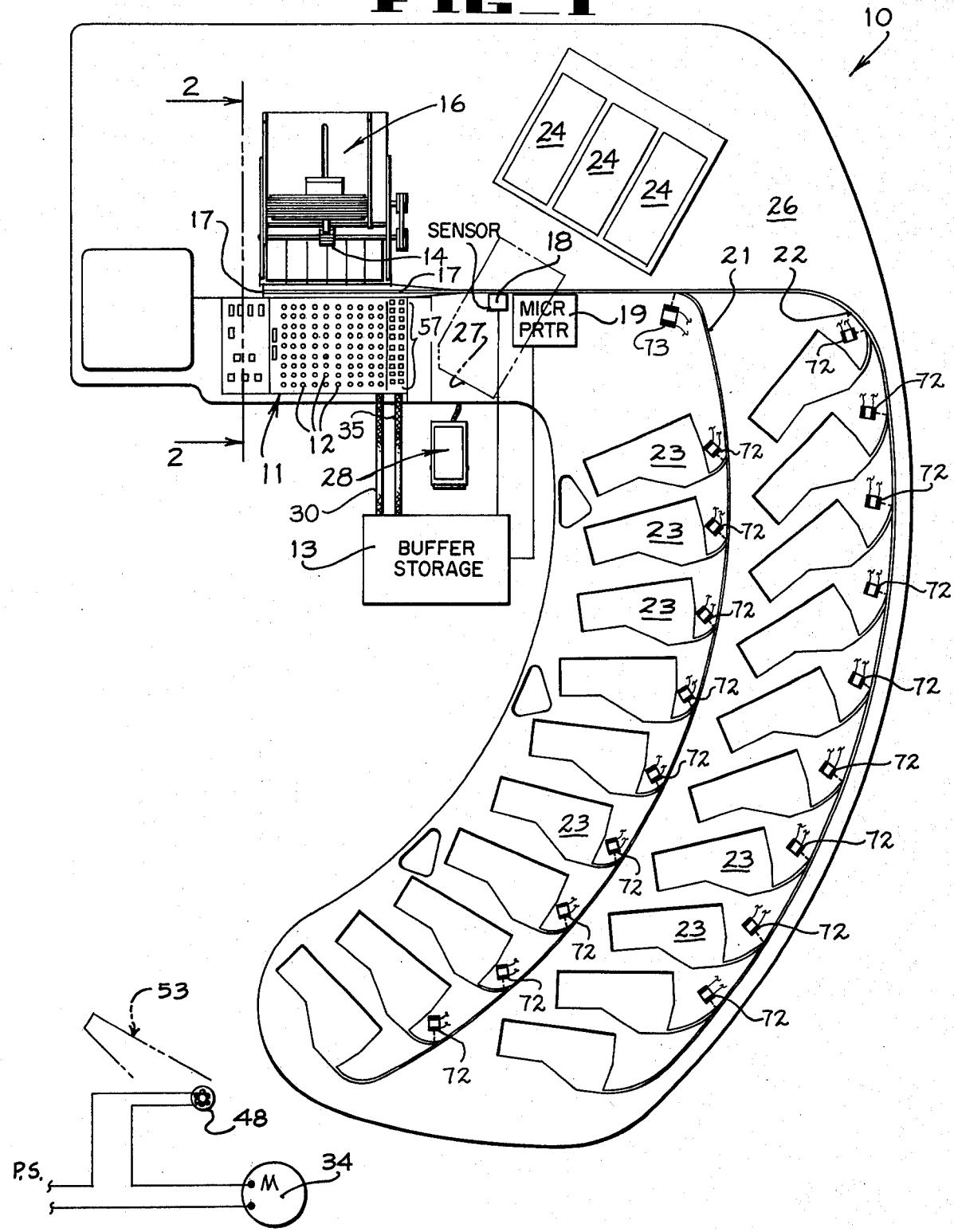

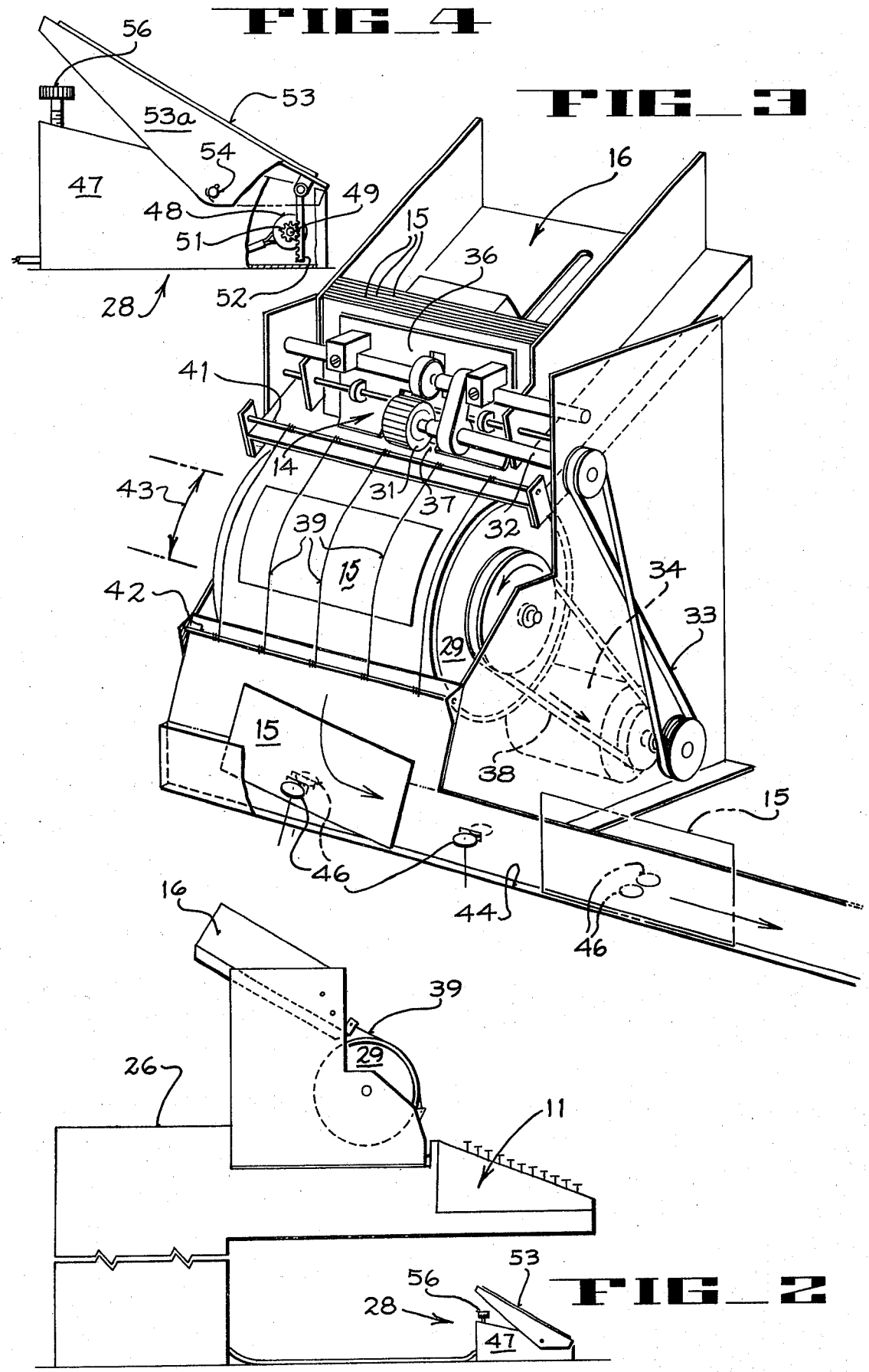

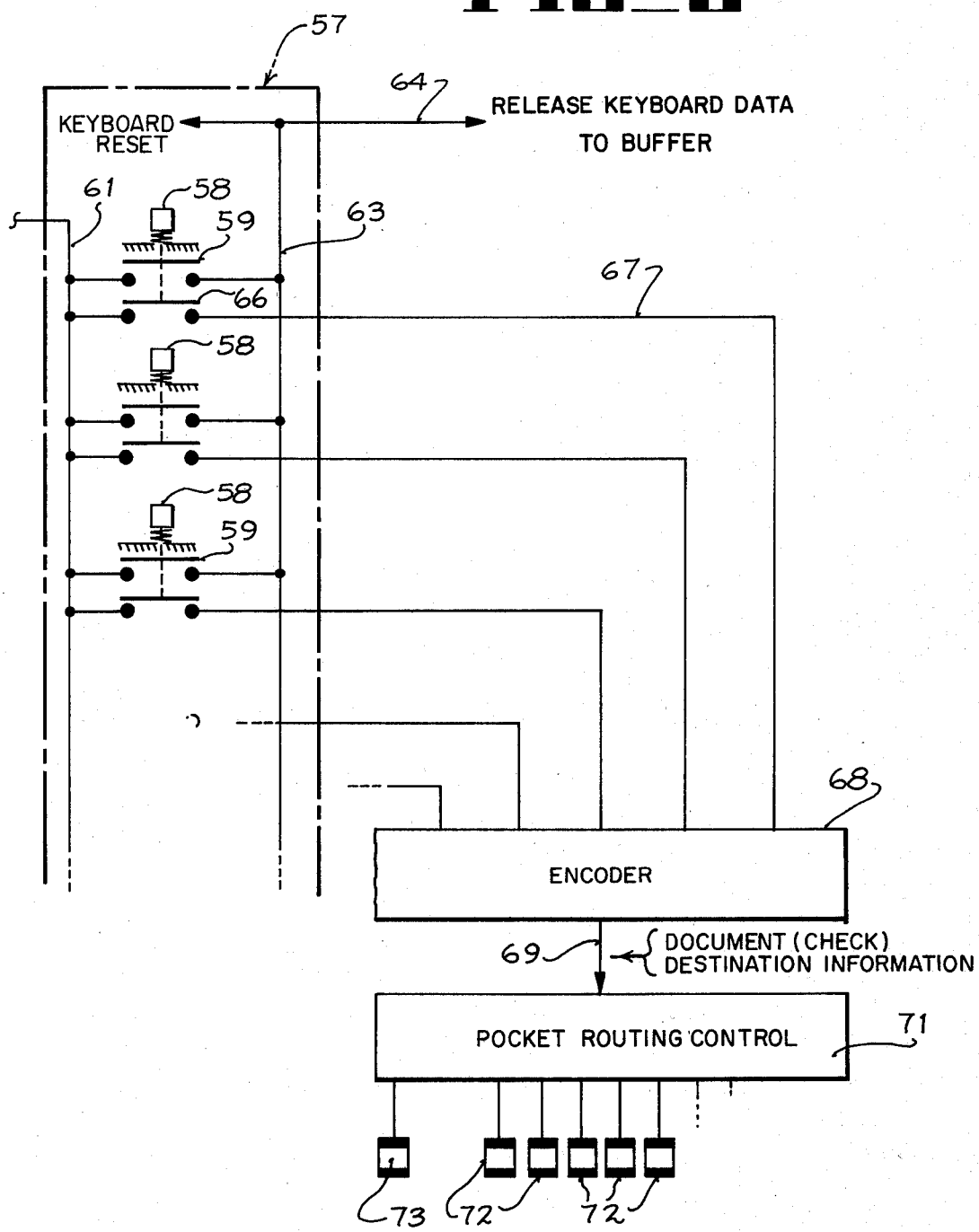
FIG_6

DOCUMENT TRANSPORT AND SYSTEM

BACKGROUND OF THE INVENTION

This invention pertains to document transport system. This invention is particularly useful as a bankproof machine where the documents which are transported are typically checks.

While it will be readily evident that the present invention has a relatively wide range of application in transporting documents and recording upon documents so transported, the term "check" will be used throughout to refer to any and all such documents whether used in banks, businesses or in conjunction with invoices and other types of documents being handled in the same or similar manner. The description herein is directed primarily to the particular application in a bank-proof machine of a type in which checks are to be handled and data from the checks recorded by means of a keyboard onto the check in machine-readable code or form, such as the well-known MICR printing which permits the document to be readily handled by computer devices and the like.

After the checks are so encoded, they are sorted by means of a conventional sorter and then may be processed through usual data processing means.

The problem in the past with the system as above described has been that stacks of checks would be handed or given to a keyboard operator and the keyboard operator was required to pick up each check with one hand and to operate a keyboard with the operator's other hand for recording the data. Thus, it is readily evident that the prior systems consisted essentially of a "one-handed" keyboard operation whereby each check is manually handled by one hand and information recorded using the other.

Operation of the keyboard typically requires the striking of alpha numeric keys followed by striking a so-called "motor bar" which effects transfer of the alpha numeric information out of the keyboard, such as to a buffer storage (in the present system) or to provide a tape print out (in an adding machine, for example).

As disclosed herein, a system is employed using a larger size keyboard of a type for normal use with two hands conjointly for recording onto the checks data read from the checks by the keyboard operator as the checks are fed under control of the operator at a rate selected by the operator. Accordingly, the disclosed system herein represents a distinct improvement as to the speed with which checks can be proofed in the operation of a bank or with which other documents can be recorded and handled in the operation of other businesses.

Further, as disclosed herein, the speed of operation has been additionally increased by using the "pocket select" keys to function as the motor bar thereby eliminating one of the three strokes described above.

SUMMARY OF THE INVENTION AND OBJECTS

In general, a document transport system includes a keyboard of a type for normal use with two hands acting simultaneously for recording data read from documents by the keyboard operator. A feed hopper feeds documents one at a time from the hopper to a document-transport channel for carrying the documents therealong. A cyclic document transport carrier is interposed between the hopper and the transport channel. The surface of the cyclic carrier is disposed to receive documents thereon from the hopper at a position to be read by the operator of the keyboard as the carrier moves to carry the documents to the document-transport channel. Means are provided for retaining the documents to move with the carrier for reading by the operator and for releasing the documents from the carrier at a position in the movement thereof so as to discharge the documents into the transport channel. Finally, means are provided for moving the documents along the channel.

In addition to the foregoing a buffer storage means coupled to the keyboard responds thereto for storing the data of each document in succession in response to keyboard operation representative of the data thereon. Printing means have been disposed in the path of movement of documents in the document-transport channel for printing a portion of the stored data on each document as it arrives in printing position. Further, sensing means are provided for detecting each document at a predetermined point relative to the printing means. The sensing means is coupled to the buffer storage 13 and serves, in response to detecting a check in the path, to activate the buffer storage and printing means to read out data from the buffer storage to the printing means for printing on the detected document.

In general, it is an object of the present invention to provide an improved keyboard document entry system, especially usefl in bank-proof machines.

Another object of the present invention is to provide a system of the kind described in which a keyboard can be operated with both hands at the same time so as to free the operator from manual handling of documents or checks or the like.

A further object of the present invention is to provide means for moving documents one at a time in full view in front of the operator at a speed under control of the operator.

It is a further object of the present invention to provide means for moving documents in front of the operator and for discharging the documents into a document-transport channel in a manner freely registering the documents with the bottom of the channel so as to align portions of the documents to be printed at the proper locations thereon.

The foregoing and other objects of the invention will become more readily evident from the following detailed description of a preferred embodiment when considered in conjunction with the drawings.

BRIEF DESCRIPTION OF THE DRAWINGS

FIG. 1 shows a diagrammatic plan view of a system, according to the invention, particularly adapted as a bank-proof system;

FIG. 2 shows a side elevation view taken along the line 2—2 of FIG. 1;

FIG. 3 shows a diagrammatic perspective view with portions broken away for clarity of a document transport machine, according to the invention;

FIG. 4 shows a side elevation view with a portion broken away for clarity of an operator's foot pedal shown in enlarged detail;

FIG. 5 shows an electrical diagram in conjunction with representation of the foot pedal of FIG. 4 for operating the document transport machine of FIG. 3; and FIG. 6 shows a diagram of portions of a control system, according to the invention.

DETAILED DESCRIPTION OF A PREFERRED EMBODIMENT

It is to be understood that a bank-proof machine is only an example of one application or use of a document-handling machine and data-entry system as disclosed herein, but, since it provides a particularly desirable application, the description of the document-handling system will be described herebelow in the context of a bank-proof machine.

In general, the bank-proof machine and system 10 includes a keyboard 11 having sufficient keys 12 and other operating means associated therewith for use with both hands of an operator thereof simultaneously.

Thus, it will be readily evident that keyboard 11 constitutes a much larger scale, greater power keyboard than the usual ten key keyboards thereby permitting the use of both hands of the operator in the entry of data into a buffer storage 13 of known design for purposes described further below.

System 10 further includes the check-feeding mechanism 14 disposed and operating in association with a check-feeding hopper 16 for feeding checks one at a time in full view of an operator (not shown) into check-transport channel 17. As checks enter channel 17, the bottom edge of the check 15 registers with the bottom surface 44 of the channel 17. The checks are moved by suitable means 46 laterally to a sensing means 18 of known design coupled to buffer storage 13. The recorded data of that particular check is read out in the known manner to the printing means 19 for printing machine-readable (or other) information onto the check, such as employed with MICR printing.

Subsequently, the checks leaving the position of printer 19 move through channels 21, 22 for purposes of being sorted into one of a number of sorting cribs 23 in accordance with known techniques.

As shown in FIG. 1, trays 24 are provided upon table 26 for the operator's convenience for temporary holding of check bundles in processing the checks.

A master control printer, such as journal printer 27, has been shown in its regular position for preparation of a permanent record of all transactions as employed in a bank-proof machine activity.

Finally, and as will be described in greater detail below, a foot pedal control assembly 28 electrically controls the speed with which the checks are fed downwardly into transport channel 17 so that the operator can control the rate of movement to a suitable speed.

Thus, in general, the system disclosed in FIG. 1, and in the other figures, represents a two-handed keyboard wherein as the checks pass in full view of the operator, both hands can be used simultaneously to record data into buffer storage 13. Buffer storage 13 is coupled to the keyboard and responsive thereto for storing the data of each check in succession in response to keyboard operation representative thereof. The system further includes means carrying each check along a predetermined path, such as channel 17, subsequent to storage of data in storage 13. A printing means 19 disposed in path 17 prints a portion of the stored data on each check. Sensing means, such as a conventional presence detector 18, serves to detect a check at a predetermined point in the path relative to the printing means. The sensing means coupled to the buffer storage in standard configuration serves, in response to detecting each check in the path, to activate the buffer storage and printing means so as to read out data from storage 13 to printing means 19 for printing data on the detected check.

The above described system significantly increases through-put of documents, such as checks (when used as a bank-proof machine), using the check or other document-handling equipment as now to be described.

In the context of a bank-proof machine, for example, a check-transport system includes a two-handed keyboard 11 as described above. The check-transport channel 17 proximate the keyboard receives checks therein and includes means for moving the checks along the channel (as disclosed further below). Feed hopper 16 receives a group of checks and means 14 feeds the checks from the hopper one at a time to the check-transport channel 17. Disposed between the hopper and channel 17, means are provided for receiving the checks individually and for transporting them to transport channel 17 in full view of the operator at a rate variably controlled by the operator to permit the operator to record data from the checks using the keyboard.

Thus, feeding means 14 (FIG. 1) is best shown in FIG. 3 wherein a relatively large diameter rubber feed roller 31 having a corrugated periphery is mounted upon a shaft 32 driven by belt 33 from a drive motor 34.

Feed roller 31 protrudes into hopper 16 through a shield 36 formed with an opening 37 so as to permit roller 31 to engage the checks 15 and draw them downwardly one at a time beneath shield 36 and onto the periphery of drum 29.

Belt 38 drives drum 29 while means, stationary with respect to the channel 17, serves to retain the checks 15 to the surface of drum 29 for a portion of its cyclic travel.

Accordingly, each of a plurality of elongate strands 39 disposed in laterally spaced relation distributed along a lengthwise portion of the periphery of drum 29 is anchored at opposite ends respectively to the cross rods 41, 42 located above and below that arcuate portion 43 of the periphery of drum 29 engaged by strands 39.

Thus, each strand engages the periphery of drum 29 along an arcuate portion thereof. The strands serve to engage and guide checks from feed hopper 16 onto drum 29. The lower ends of strands 39 diverge from the drum so as to release the checks from the drum to fall freely at a position above transport channel 17 so as to be received thereby in edge-wise relation.

As each check 15 falls into transport channel 17, positively acting drive means engage the checks and urge the bottom edge of each check into registration with the bottom surface 44 of guide channel 17.

Accordingly, several pairs of opposed drive rollers 46 are disposed to engage each falling check 15 in the nip defined between each pair of rollers so as to positively direct the check toward the bottom surface 44 of channel 17 and to laterally advance the check therealong.

A factor limiting the through-put of checks through a bank-proof machine or other document-handling apparatus typically has been related to the manner of handling the input documents. Frequently, data input from the incoming documents is accomplished by means of relatively low power, one-handed keyboard devices commonly known as "10 key" keyboards. These keyboards have been used in conjunction with systems wherein the other hand of the operator is employed to hand feed checks into the check-transport channel 17 and, accordingly, the through-put of the system is inherently limited.

As disclosed herein, however, means in the form of foot pedal assembly 28 allows the operator to feed checks into transport channel 17 in full view of the operator at a rate variably controlled by the operator. Thus, as shown best in FIGS. 4 and 5, foot pedal assembly 28 comprises in general a stationary housing 47 or base containing a variable resistor 48 employing a wiper (not shown) mounted for rotation with a shaft 49. Shaft 49 carries pinion gear 51 disposed in engagement with a downwardly depending rack element 52 carried to extend and pivot downwardly from beneath the heel portion of a pivoted foot pedal member 53. Pedal 53 is mounted for pivoting movement about an axis 54.

Lines 30, 35 (FIG. 1) diagrammatically represent the known functions of transferring dollar amount data and "motor bar" action on the one hand, and the pocket selecting function on the other.

Means for conjointly reading out the dollar amount keyboard information to buffer storage 13 while supplying pocket destination information indicating which of the various pockets 23 is to be the destination of the check comprises the group of motor bar/pocket select keys 57.

Each key 58 is indicated diagrammatically in FIG. 6. Keys 58 are spring-loaded upwardly as shown and each key is provided with a double armature arrangement in which one armature, such as 59, when moved to engage associated contacts, serves to release the dollar amount data from the keyboard and to activate the input to buffer storage 13 via line 64. Line 64 is also coupled to reset the depressed "dollar amount" keys 12 on keyboard 11.

The other armature 66 of each key 58 couples the power supply line 61 to lead 67 of an encoder circuit of known construction capable of determining which one of the several inputs thereto has been activated and thereby providing a coded output represented schematically in FIG. 6 simply as the single line 69.

The output of encoder 68 operates the pocket routing control circuitry 71 of known construction whereby the checks or other documents which are in transit along the channel 17 will be properly gated to their intended pockets 27 by activating the various solenoids 72 associated with known deflecting mechanisms at each pocket entry along the branch channels 21, 22 (as well as the solenoid 73 associated with the selection of one or the other of the two channels 21, 22).

In operation, pedal 53 can be moved variously to any given position where it will remain until moved again to a different position. Accordingly, a certain degree of friction is provided between the side face of housing 47 and the inner confronting face of side flanges 53a of pedal 53 so as to retain pedal 53 at any position selected by the operator.

Means serving to insure that rack 52 is not pulled fully out of engagement with pinion gear 51 and further serving to provide an adjustable limit to the rate of feeding documents comprises the upwardly extending threaded stop element 56. Element 56, formed with knurled top, may be readily threaded downwardly or upwardly into and out of housing 47 and forms a limit stop for the movement of pedal 53.

As shown in FIG. 5, drive motor 34 is shown in circuit with variable resistor 48 whereby, as member 53 is moved between advanced and retracted positions, the rate of operation of motor 34 will be speeded or retarded thereby controlling both the rate of rotation of drum 29 and the rate of feeding documents from hopper 16.

From the foregoing, it should be readily evident that there has been provided an improved document transport system, especially useful as a bank-proof system and one in which the input rate of feeding checks or other documents can be readily increased by employment of a full sized keyboard and cyclic means for feeding the checks at the maximum rate which the operator can comfortably and accurately enter data into the system for printing on the document in machine-readable or other form.

I claim:
1. A document transport system comprising a keyboard of a type for normal use with two hands simultaneously for recording data read from documents by a keyboard operator, a feed hopper disposed to feed documents one at a time from said hopper, means defining a document transport path adapted to carry said documents therealong, a cyclic document transport carrier interposed between said hopper and said path, the surface of said carrier being disposed to receive documents thereon from said hopper at a position exposing the documents for reading by the operator of the keyboard as said carrier moves to carry the documents to said document transport path, means for retaining said documents to move with said carrier during reading by the operator and for releasing said documents from said carrier at a position in the movement thereof so as to discharge said documents into said transport path, and means for moving the documents along said path.

2. In a system according to claim 1 which said carrier comprises a rotatable drum member, means for continuously rotating said drum, and means external to said drum serving to retain said documents to the surface of said drum during a predetermined arc of travel thereof while permitting said checks to remain exposed to view of the keyboard operator as they move through said arc.

3. In a system according to claim 1 in which the retaining means comprises means overlying the periphery of said carrier and disposed to remain stationary relative to the moving carrier while permitting said documents to move with said carrier in full view of the keyboard operator.

4. In a system according to claim 1 in which said carrier comprises a rotating driven drum and said retaining means comprises elongate strands disposed in laterally spaced relation distributed along a lengthwise portion of the periphery of said drum, each strand engaging the periphery of said drum about an arcuate portion thereof, said strands serving to engage and guide documents from said hopper to said drum and then to diverge from said drum to release said documents from the drum to fall freely at a position above said transport channel to be received thereby.

5. In a document transport machine of the type employing a keyboard for use by an operator to record data from documents read by a keyboard operator, a feed hooper disposed to feed documents one at a time from said hopper, a document-transport channel for carrying said documents away, a cyclic carrier disposed between said hopper and said transport channel, the surface of said carrier being disposed to receive documents thereon delivered from said hopper, means for retaining said documents to said carrier for a predetermined movement of said carrier arranged to expose said documents sufficient to permit the operator to read the documents thereon during said predetermined movement and for releasing said documents from said carrier at a predetermined point in the movement thereof to discharge each released document to be received by said channel.

6. In a bank-proof machine comprising a check-feeding hopper and a check transport channel, a cyclic drum disposed between said hopper and said transport channel, the surface of said drum being disposed to receive checks thereon delivered from said hopper, means external to said drum carried by a portion of said machine for retaining said checks to said drum for a predetermined movement of said drum sufficient to permit the operator to read them and for releasing said checks from said drum at a predetermined point in the movement thereof, said drum surface being positioned and spaced from said check-transport channel sufficiently to permit said checks to fall freely into sid channel upon being released from said drum.

7. In a bank-proof machine comprising a check-feeding hopper and a check transport channel, a cyclic drum disposed between said hopper and said transport channel, the surface of said drum being disposed to receive checks thereon delivered from said hopper, means for retaining said checks to said drum for a predetermined movement of said drum sufficient to permit the operator to read them and for releasing said checks from said drum at a predetermined point in the movement therof, said drum surface being positioned and spaced from said check-transport channel sufficiently to permit said checks to fall freely into said channel upon being released from said drum, said transport channel including a slot to receive said checks, said slot having a bottom surface thereto for registration with the bottom edge of the checks so as to align the checks to be adapted to be printed thereon.

8. In a bank-proof machine of the type having a keyboard for entry of data from checks read by a keyboard operator and having means carrying each of the checks away from the keyboard region to one of a number of selected destinations, a buffer storage means for receiving dollar amount data from the keyboard, and means for selecting one of the destinations for each check, the improvement comprising a group of destination-designating keys carried on said keyboard, means associated with each said key for conjointly designating a related one of said destinations and releasing data from the keyboard to transfer same to said buffer storage means.

9. In a document-handling machine the system comprising a keyboard having sufficient keys and operating means therof for concurrent use with both hands of an operator, means for passing documents along a predetermined path in full view of a keyboard operator disposed in operating position at said keyboard, means variably controlled by said operator for moving said documents at selected rates to permit the operator to read data from each document and to enter same at the keyboard, buffer storage means coupled to said keyboard and responsive thereto for storing the entered data of each document in succession in response to keyboard operation representative of said data, means carrying each document along a predetermined path subsequent to storage of said data, printing means in said path for printing a portion of the stored data on each said document, and sensing means for detecting the presence of a check at a predetermine point in said path relative to said printing means, said sensing means being coupled to said buffer storage and said printing means and serving in response to detecting each check in said path to activate said buffer storage and printing means to read out data from said storage to said printing means for printing on said detected document.

10. In a document transport and data-entry system, a keyboard having sufficient keys and operating means for concurrent use with both hands of an operator thereof, a cyclicly moving document carrier for carrying documents thereon one at a time in full view of the keyboard operator, and means controllable by the operator when positioned at the keyboard for varying the rate of movement of said carrier, the last named means comprising a variable speed motor for driving said carrier, and means controlled by the operator for selecting the speed of the motor, the means for selecting the speed of the motor comprising an electrical element having means for varying the state thereof disposed in circuit with the drive motor for varying the speed of the drive motor, and a foot pedal for varying the state of said element to vary the speed of said motor.

* * * * *